June 10, 1969 C. F. CHONG 3,449,730

MAGNETIC MEMORY EMPLOYING REFERENCE BIT ELEMENT

Filed Dec. 14, 1964

INVENTER
CARLOS F. CHONG

BY Rene A. Kuypers

ATTORNEY

United States Patent Office 3,449,730

Patented June 10, 1969

3,449,730

MAGNETIC MEMORY EMPLOYING REFERENCE BIT ELEMENT

Carlos F. Chong, Philadelphia, Pa., assignor to Sperry Rand Corporation, New York, N.Y., a corporation of Delaware Filed Dec. 14, 1964, Ser. No. 418,174
Int. Cl. G11b *5/02*
U.S. Cl. 340—174 4 Claims

ABSTRACT OF THE DISCLOSURE

This invention obtains improved discrimination between a binary zero and one. Improved signal discrimination is obtained in one embodiment by utilizing a thin film dummy bit in conjunction with each address bit of a memory word. The output signal of the address bit in combination with the reference bit after detection by a differential amplifier is either twice the output of a single memory bit or zero depending upon whether a binary zero or one is stored.

This invention relates in general to a memory system. In particular, this invention relates to a technique for improving signal discrimination in a digital memory system.

A known prior art technique for increasing signal discrimination in a magnetic core memory system consists in utilizing a reference core in common with each bit of a memory word. The reference core is always magnetized in the same direction. The cores of the particular word are magnetized randomly in one of two directions. During a memory read cycle, the output signals from the reference cores and the respective cores of a word are directed into the input terminals of respective differential sense amplifiers whereat the signals are algebraically subtracted for further detection. The above discussed prior art technique has several shortcomings as will be discussed hereinafter.

The difficulty with using a reference core in the above-mentioned arrangement may be better understood when considering only the reference core in conjunction with one bit of a word. Thus, during a memory read cycle if the reference core is in a "zero" remanent state, (i.e., the upper portion of a B-H curve) and an address core is in the "one" remanent state, (i.e., the lower portion of a B-H curve) the output of the reference core in response to being driven to saturation at the zero end of the B-H curve, will actually be of very small amplitude (actually a noise signal called DELTA noise), whereas the output signal of the address core will be substantially greater. In such a situation, the resultant signal produced by a differential amplifier circuit which receives the above-mentioned two signals will not be materially enhanced if at all over the output signal of the address core itself. As a matter of fact, the signal of the pair may be slightly less than that of the single core. However, when the pair are both magnetized on the upper portion of a B-H curve, the two DELTA noise signals will cancel. In other words, the prior art improves discrimination by cancelling the noise signal when the pair is magnetized in the same direction. It will be apparent hereinafter that the prior art is deficient because the reference core and the address core do not produce output signals having the same absolute amplitude (i.e., without regard to polarity).

It is therefor an object of this invention to provide a new and improved memory system.

It is a further object of this invention to provide an improved detection arrangement for a memory system.

It is still a further object of this invention to provide a memory system which provides improved signal discrimination.

In accordance with a feature of this invention, there is provided a thin film memory system which incorporates a thin film reference bit for each thin film address bit of a memory word. Individual sense lines are provided which are juxtaposed to the respective address bits and the reference bits. These sense lines are terminated at the two inputs of respective differential amplifiers. The above-mentioned thin film elements have the property of uniaxial anisotropy so that when the magnetic moments of an address bit of a memory word and its associated reference bit are rotated from the easy axis toward the hard axis of magnetization during a read cycle, voltages are induced in the respective sense lines. The reference bit is magnetized in one direction while the address bit can be magnetized in one of two directions depending on the information stored. If the voltage induced in its sense line by the reference bit and the voltage induced in its sense line by the address bit are of the same polarity, the resultant output of the differential amplifier will be zero. On the other hand, if the voltages induced in the respective sense lines by the reference bit and the address bit are different, the differential amplifier algebraically subtracts the two signals so that the resultant output voltage is twice the output voltage of a single thin film element.

Thus, a thin film element magnetized as either a binary one or zero can be readily distinguished during a memory read cycle when used in conjunction with a reference bit, since the signal amplitude in the one case will be twice the signal amplitude generated by switching a single bit, and in the other case, the amplitude of the signal will be zero. This memory arrangement permits improved discrimination to be obtained between a binary zero and a binary one.

The novel features that are considered characteristic of this invention are set forth with particularity in the appended claims. The invention itself, however, both as to its organization and the method of operation, as well as additional objects and features thereof, will best be understood in the following description when considered in conjunctiton with the accompanying drawing, wherein:

FIGURE 1 is a schematic arrangement of the invention wherein a different cancelling bit is provided for each address bit of a memory word;

FIGURE 2 indicates the output signals of an address element and a cancelling element of the memory arrangement of FIGURE 1, as well as the resultant output signal of an associated differential amplifier;

Figure 1:
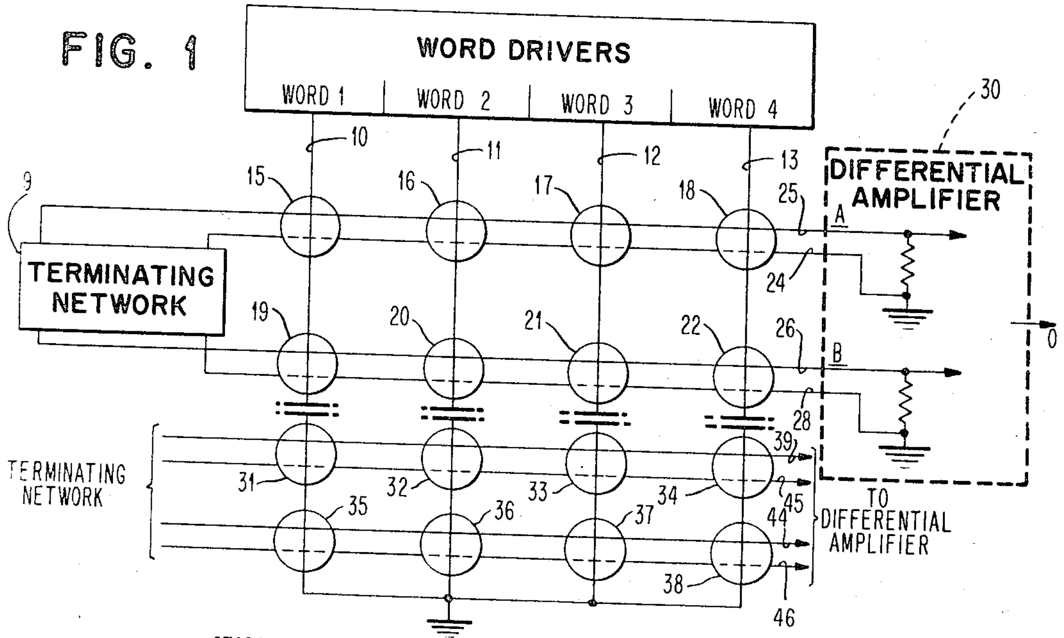

Referring now to FIGURE 1 in greater detail, the bits 15, 16, 17 and 18 are depicted of a planar, thin film memory device. The memory bits or thin film elements 15, 16, 17 and 18 are the corresponding bits (i.e., the same positioned element of different words) of four memory words which are designated as words 1, 2, 3 and 4. Bits 15, 16, 17 and 18 will be referred to hereinafter as the address bits or elements. Associated with each of the address elements 15, 16, 17 and 18 is a closely oriented thin film element 19, 20, 21 and 22. These bits will be referred to hereinafter as cancelling bits or elements. These latter bits are also termed dummy bits in the present state of the art.

Since words 1, 2, 3 and 4 are multi-bit words, the last bits of these words are designated respectively by the address elements 31, 32, 33 and 34. Associated with these latter mentioned elements are the cancelling bits 35, 36, 37 and 38.

The address bits 15–18, 31–34 and the cancelling bits 19–22, 35–38 are, in accordance with this invention, thin film elements plated or deposited on a substrate material (not shown) in the presence of a DC magnetic field. The deposition of the planar, thin film elements in the presence of the DC field causes the elements to acquire the property of uniaxial anisotropy. In other words, the thin film elements acquire a preferred direction of magnetization (i.e., an easy direction of magnetization). Positioned contiguous to the planar, thin film elements are the sense lines 25, 26, 39 and 44. In the embodiment shown, one end of the sense lines 25 and 26 are connected to the respective input terminals A and B of the differential sense amplifier 30. The other ends of the sense lines 25 and 26 are connected to the terminating network 9. The terminating network 9 may simply comprise a ground post or a matching impedance as will be discussed in greater detail hereinafter. The lines 24, 28, 45 and 46 are ground return lines from the terminating network 9 to the differential amplifier 30. The lines 24, 28, 45 and 46 may also represent a ground plane. In such an arrangement, the planar thin film elements would be deposited on a metal substrate such as copper. If a ground plane system is to be utilized, the ground lines 24, 28, 45 and 46 would, of course, all represent the same ground plane.

It should be understood that the sense lines 39 and 44 as well as the ground lines 45 and 46 are also directed into a respective differential amplifier (not shown) and terminating network (not shown). In other words, each corresponding address bit and its associated dummy bit has its own differential amplifier device.

Positioned orthogonally to the sense lines 25, 26, 39 and 44 are the word or drive lines 10, 11, 12 and 13. The drive lines 10 to 13 are connected at one end to ground potential and at their other end to respective driving circuits (not shown). As is well known in the art, when a certain word of a memory is interrogated during a read cycle the drive line associated with words 1, 2, 3 or 4 is energized by conducting current from the driving circuit to ground potential or vice versa.

The operation of a thin film memory system is well known in the art and its salient characteristics will be briefly discussed below. Thus, when it is required to interrogate a particular word for the information stored therein, the required drive line is energized by conducting current therethrough. A magnetic field is thereby generated in accordance with Ampere's law which causes the magnetic moment of the thin film to be rotated from the easy toward the hard axis of magnetization. The rotation of the magnetic moment induces a voltage in the juxtaposed sense lines such as lines 25, 26, 39 and 44. In other words, the sense lines detect the change in flux, $d\phi/dt$.

It will be recalled that for each bit of a memory word such as 15 to 18, there is a corresponding dummy or cancelling element 19 to 22. In accordance with this invention, the cancelling elements are always magnetized in the same direction along the easy axis of magnetization. In other words, the cancelling elements 19 to 22 and 35 to 38 will either be magnetized as binary one's or binary zero's. On the other hand, the bits 15 to 18 and 31 to 34 are magnetized randomly as either binary ones or zeros.

Assume that it is now required to read out the information stored in the bits 15 and 31 of word 1 of the memory. Let us further assume that the thin film elements 15 is magnetized to store a binary one and element 31 is magnetized to store a binary zero. Furthermore, the dummy bits 19 and 35 of this example are both magnetized as binary zeros. The energizing of the drive line 10 will therefore produce an orthogonal magnetizing force which will rotate the magnetic moments of the respective thin film elements 15, 19, 31 and 35 toward the hard axis of magnetization. The rotation of the magnetic moments of the bits 15 and 31 will induce a positive and negative signal in their respective sense lines 25 and 39. These signals are depicted on line A of FIGURE 2. The negative voltages of the dummy bits 19 and 35 are shown on line B thereof.

The operation of the memory will now be discussed with respect to the induced signals, the terminating network and the differential amplifier circuitry. Thus, if the terminating network 9 is terminated in an impedance which directly matches the impedance of lines 25 and 26, the induced voltages will not only travel toward the right to the differential amplifier 30 but the same voltages (of opposite polarities) will also travel toward the left and will be absorbed in the terminating resistor. On the other hand, if the terminating network 9 is at ground potential, the signals induced in the sense line will not only be directed to the right and to the differential sense amplifier 30 but the same signals (of opposite polarities) will also be directed toward the left where they will be reflected with phase inversion back to the amplifier 30. If the sense lines 25 and 26 are short enough, the pulses that are reflected back to the amplifier 30 will substantially coincide with the wave which was transmitted toward the right. The above discussion with respect to terminating networks is in accordance with well known transmission line theory.

Referring again to FIGURE 2, it is observed that the signal produced by the dummy bit 19 (line B) is reversed in polarity from the signal produced by the address element 15 and the signal produced by the address bit 31 is the same as the signal produced by the dummy bit 35. The differential sense amplifier 30 receives the two signals (i.e., terminal A receives the positive signal and terminal B receives the negative signal) and algebraically subtracts them so as to produce a resultant pulse at terminal 0 whose amplitude is twice that of the signal of address bit 15. The resultant signal of the amplifier 30 is depicted on line C of FIGURE 2. By way of example, if the pulse entering terminal A has the magnitude of +E and the pulse entering terminal B has a magnitude of —E, the output of the amplifier 30 is 2E.

In the case where a differential amplifier receives two negative signals, it will again produce an output which is the algebraic difference of the two signals or zero volts. The resultant zero output signal of the amplifier is shown on line C of FIGURE 2.

Figure 2:
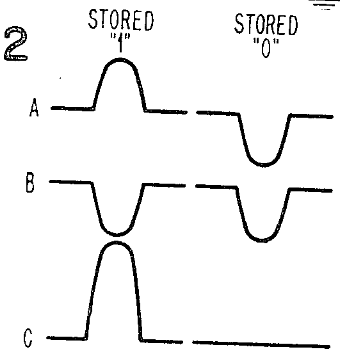

It is readily apparent therefore, that the invention described with respect to FIGURES 1 and 2 produces a more easily usable signal. The nominal output voltage for a thin film element is anywhere from 1–5 millivolts depending upon the thickness of the plating. In accordance with this invention, the nominal output of a thin film element is increased to 2–10 millivolts. Thus, if the output in a particular embodiment for a binary one is 10 millivolts and the output for a binary zero is 0, then the discrimination ratio is ten to one.

The invention of FIGURE 1 has been described for a read cycle only. It should be understood, that during a write cycle either a binary zero or one may be recorded in any of the bits 15 to 18 and 31 to 34. New information is recorded in any of these bits by energizing the required drive line so that the magnetic moments of the required thin films are rotated from the easy toward the hard axis of magnetization. Simultaneously with the energizing of the required drive line, a steering current is sent down a bit line (not shown) by a bit driver (not shown) so that the film's magnetic moment is rotated to the required direction along the easy axis of magnetization. In the embodiment shown in FIGURE 1, the cancelling elements 9 to 22 and 35 to 38 are permanently magnetized in the binary zero direction and hence do not require recording circuitry.

Figure 3:
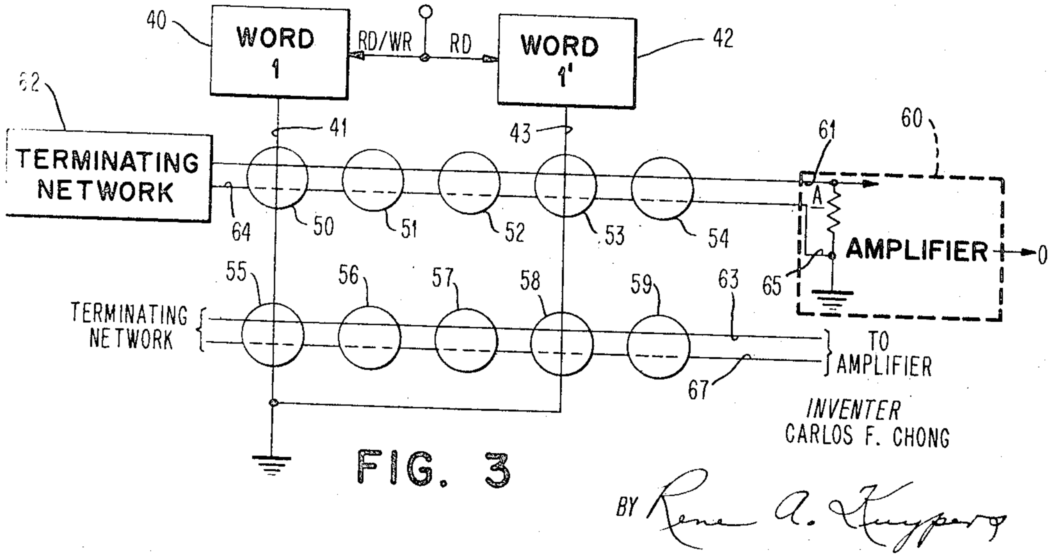
FIGURE 3 shows an alternate arrangement of providing a cancelling element for each corresponding address element of a plurality of memory words.

Referring now to FIGURE 3, there is depicted another embodiment of the invention. In this particular embodiment, one cancelling bit or dummy bit 53 is provided for each of the corresponding bits of a plurality of words.

Thus, considering that the memory of FIGURE 3 has the same capacity and general layout as that of FIGURE 1, the last bits 55, 56, 57 and 59 of each word are shown with their related cancelling bit 58. For the sake of simplicity, only one word drive line 41 is depicted. However, since only one reference bit is utilized for each of the corresponding word bits, an extra drive line 43 is required therefore as will be discussed hereinafter.

The sense line 61 is connected to the input terminal of a regular amplifier circuit 60 (as opposed to a differential amplifier of FIGURE 1). The other end of the sense line is connected to a terminating network 62. The line 64 represents a ground return line or, in fact, a ground plane device. The lines 63 and 67 are the counterparts of the lines 61 and 65, respectively, and are connected to an identical terminating network and amplifier (not shown). Except for the following described differences, the operation is similar to that of FIGURES 1 and 2.

Thus, to read out the information stored in the address bits 50 and 55 of word 1, the drive line 41 is energized by appropriate circuitry (not shown). However, since the reference bits 53 and 58 do not lie under drive line 41, they must be simultaneously driven by a separate drive line 43. This drive line is energized by driving circuitry shown in the block diagram 42. It should be be understood that other circuit techniques are available for the simultaneous energizing of lines 41 and 43. For example, drive lines 41 and 43 might be driven in parallel by the same driving circuitry.

The energizing of drive lines 41 and 43 caused voltages to be induced in the sense lines 61 and 63 with a polarity which depends upon the magnetization of the elements along the easy axis. Assuming that address bits 50 and 55 are magnetized identically with bits 15 and 31, respectively, that is, as a binary one and binary zero, and dummy bits 53 and 58 are magnetized oppositely from reference bits 19 and 35, that is, as binary ones, the resultant output signals from the amplifier 60 will be the same as that of the amplifier 30.

Figure 4:
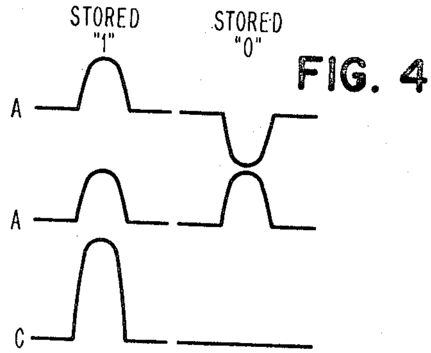
FIGURE 4 depicts the output signals of the memory arrangement of FIGURE 3 as well as the output signal produced by an associated amplifier device.

Thus, the simultaneous energizing of lines 41 and 43 causes two positive signals to be induced in the sense line 61. This is depicted in FIGURE 4. The amplifier 60 will receive these two signals at terminal A and produce an output signal at terminal 0 which is twice that of a signal from a single address bit.

Similarly, the address bit 55 is magnetized as a binary zero and the dummy bit 58 is magnetized as a binary one. In this case, the energizing of the drive lines 41 and 43 produces a negative signal from address bit 53 and a positive signal from dummy bit 58. The resultant output signal from an amplifier (not shown) would be zero volts. In the embodiment of FIGURE 3 it is clear that one dummy bit can serve the corresponding address bits of a plurality of memory words.

While the instant invention has been described with respect to a planar, thin film element, it is obvious that it is readily adaptable to any memory device which can produce an output signal of substantially the same absolute magnitude but of opposite polarity depending on its remanent state in the case of magnetic devices, or on its stored information with respect to non-magnetic devices. Memory elements having the above described characteristics are twistors, plated wires and cryogenic devices, etc.

In summary, this invention relates to a digital memory device that utilizes a dummy bit in conjunction with each address bit of a memory word wherein the improved discrimination is obtained between a binary zero and one. In accordance with the invention, an improved signal discrimination is obtained since the output signal of a memory bit in combination with a reference bit is either twice the output of the memory bit itself or is zero.

Obviously, many modifications and variations of the present invention are possible in the light of the above teachings. It is therefore to be understood that within the scope of the appended claims, the invention may be produced otherwise than is specifically described.

The embodiments of the invention in which an exclusive property or privilege is claimed are defined as follows:

1. An information storage system comprising, (a) a first memory element capable of being magnetized in a first and alternatively in a second remanent state to store data;

(b) a first sense line coupled to said first memory element;

(c) a second memory element capable of being magnetized in a first and alternatively in a second remanent state, said second memory element remaining magnetized in either said first or second state as a reference bit;

(d) a second sense line coupled to said second memory element;

(e) a matching impedance means, said first and second sense lines being terminated in said impedance means;

(f) a sensing means connected across said first and second sense lines, said first and second sense lines connected between said impedance means and said sensing means;

(g) a single drive line coupled to said first and second memory elements;

(h) energizing means connected to said single drive line to simultaneously induce the information stored in said first and second memory elements in said respective coupled sense lines;

(i) said sensing means producing a double amplitude signal for one binary bit and substantially no signal for the other binary bit.

2. The information storage system in accordance with claim 1 wherein a plurality of first memory elements are arranged along said first sense line and a plurality of second memory elements are arranged along said second sense line, a single drive line being coupled to a first memory element and a corresponding memory element on said second sense line.

3. The information storage system in accordance with claim 1 wherein said memory element comprises a thin film element having the property of unaxial anisotropy.

4. The information storage system in accordance with claim 1 wherein said plurality of first memory elements are arranged along said first sense line and a single said second memory element is further coupled to said first sense line, a single drive line being coupled to each said first memory element and to said second memory element, the drive line coupled to any said first memory elements and the drive line coupled to said second memory element being energized simultaneously.

References Cited

UNITED STATES PATENTS

| | | | |
|---|---|---|---|
| 3,144,641 | 8/1964 | Raffel | 340—174 |
| 3,218,616 | 11/1965 | Huijer et al. | 340—174 |
| 3,003,139 | 10/1961 | Perkins | 340—174 |
| 3,142,049 | 7/1964 | Crawford | 340—174 |
| 3,293,626 | 12/1966 | Thome | 340—174 |
| 3,303,481 | 2/1967 | Kessler | 340—174 |

OTHER REFERENCES

Publication I: Electronic Design "Two Films Per Bit Read Every 120 N sec" pp. 28 & 29, June 7, 1963; 340–174 TF.

S. M. URYNOWICZ, JR., *Primary Examiner.*